UNITED STATES PATENT OFFICE.

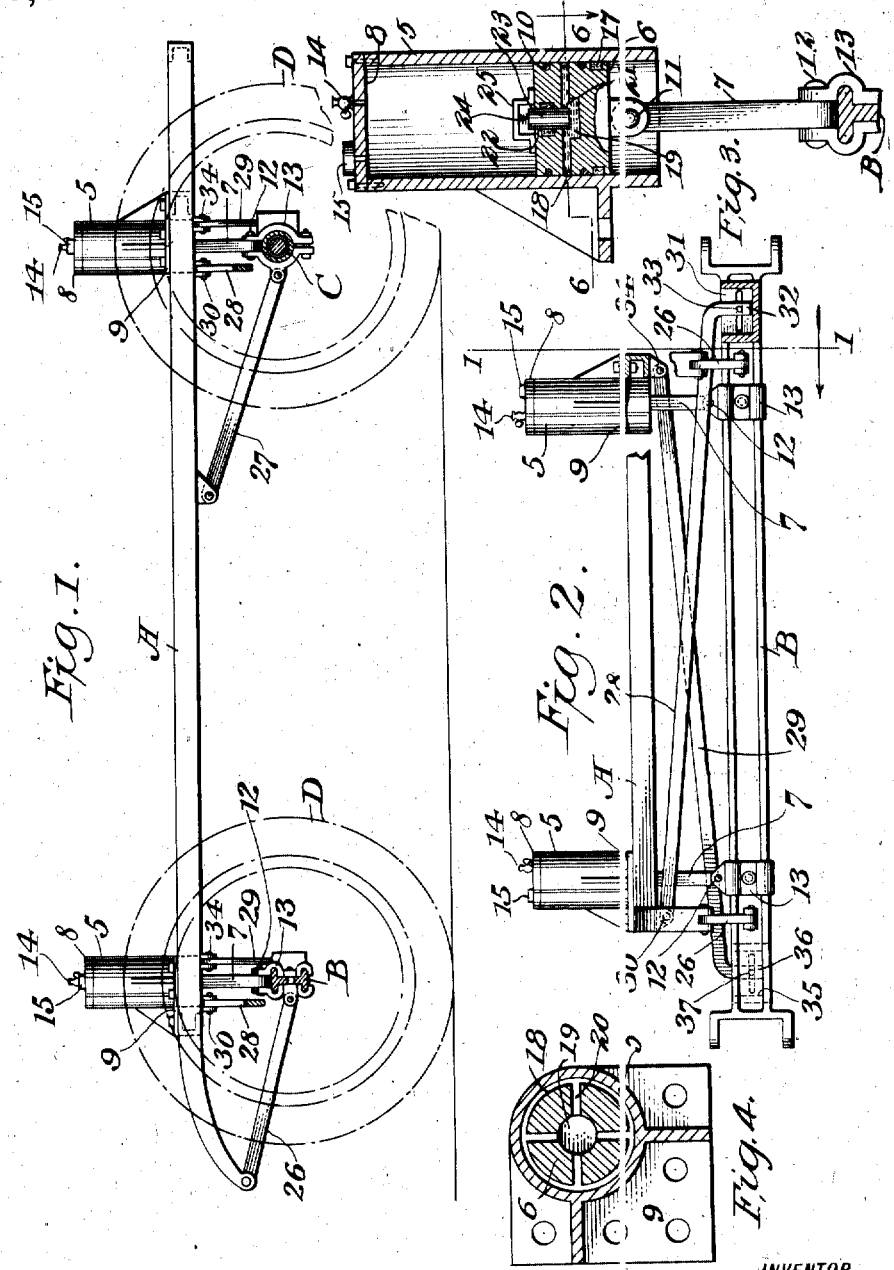

RALPH VICTOR HAYES, OF BROOKLYN, NEW YORK.

AIR-CUSHION DEVICE FOR VEHICLES.

1,220,630.

Specification of Letters Patent.

Patented Mar. 27, 1917.

Application filed August 17, 1911. Serial No. 644,110.

*To all whom it may concern:*

Be it known that I, RALPH VICTOR HAYES, a citizen of the United States, residing in the city of New York, borough of Brooklyn, county of Kings, and State of New York, have invented a certain new and useful Air-Cushion Device for Vehicles, of which the following is a specification.

As is well known, the body of vehicles are subject to jars, vibrations and shocks due to the wheels passing over irregularities in the surface of the road bed or way, and to obstructions in the road. For minimizing these shocks and jars, it is customary to employ inflated tires on the vehicle wheels, and to cushion the vehicle body by the employment of springs, shock absorbers, and other accessories designed to promote the ease of riding and the comfort of the passengers.

The present invention pertains to an improved cushion device for yieldingly or elastically supporting the vehicle body and the load imposed thereon by a cushion composed of air or other gaseous medium confined under pressure within suitable cylinders in such manner that the body will be relieved wholly, or to a great extent, from the road shocks and jars, whereby I am enabled to entirely dispense with metallic springs as a means for supporting the weight of the loaded body and with shock absorbers and other devices for minimizing the effect of road shocks upon said body.

In devices of this character, a plurality of upright cylinders, preferably four in number, are positioned at the several corners of the body, said cylinders being fastened firmly to said body, and within said cylinders are operatively positioned a like number of pistons, the rods of said pistons being connected in a suitable way to the running gear or axles of said vehicle running gear. The pistons are movable within the cylinders under the action of the vehicle wheels in passing over irregularities and obstructions in the road bed, but the resulting shock, jar or vibration is not mechanically transmitted to the vehicle body, for the reason that an elastic cushion, in the form of air or other gaseous medium under pressure, is interposed between the cylinders and the pistons, the said elastic medium being artificially established by forcing air or gas into the cylinders and said air or gas being confined within the cylinders in such manner as to permit a limited relative movement between the pistons and the cylinders, whereby the elastic medium operates to absorb, wholly or partially, the road shocks or jars so as to preclude them from affecting the vehicle body or the occupants thereof.

It is to be noted that the cylinders are charged with air or gas until a predetermined pressure is established therein sufficient to sustain the weight of the body and its load, but the air or gas pressure is materially increased by the movement of the pistons (due to road shocks or jars) relative to the cylinders.

In order to minimize the leakage of the air or gas retained under pressure in the chamber between the piston and the cylinder, it is desirable to employ a seal composed of a substance of a more or less liquid nature. It is apparent that a free liquid seal imposed upon the piston will splash within the cylinder when the vehicle is subjected to rough shocks or jars, and, furthermore, that such free liquid when in contact with the air or gas will emulsify therewith, particularly should it happen that oil be utilized as the sealing medium.

For overcoming the tendency of the sealing medium to splash within the cylinder, and to preclude its emulsification with the air or gas, my invention embodies a specially constructed piston for containing a desired quantity of the liquid which constitutes the seal, said liquid being substantially isolated from contact with the air or gas under pressure within the chamber of the cylinder. It will be understood that the cylinder is provided with means for attachment to one part of the vehicle, such as the body thereof, whereas the piston has means for attachment to another part of said vehicle, such as the running gear. Furthermore, the seal-containing piston is constructed with seal outlets so positioned that the sealing material is supplied to the contacting surfaces of the cylinder and the piston. Now, when the air or gas pressure rises above the normal or a predetermined pressure, due to a relative movement between the piston and the cylinder owing to a rough condition of the road, then the resulting increased pressure displaces a relatively small quantity of the liquid seal into the space between the opposing surfaces of the cylinder and the piston, thus effectively sealing the cushion device against the leakage of air or gas pressure.

Other features of the invention and the advantages thereof will appear in the course of the following detailed description.

In the accompanying drawings, I have illustrated different practical embodiments of the invention, but the constructions shown therein are to be understood as illustrative, only, and not as defining the limits of the invention.

Figure 1 is a side elevation partly in section of a motor driven vehicle provided with load carrying devices for the body constructed in accordance with this invention, the plane of the section being indicated by the dotted line 1—1 of Fig. 2 looking in the direction of the arrow.

Fig. 2 is an end elevation of the vehicle shown in Fig. 1, the wheels being omitted.

Fig. 3 is a vertical section of another embodiment of a coöperating cylinder and piston illustrating a preferred construction of the piston adapted for containing a liquid seal which is adapted, by the pressure of the elastic shock absorbing medium, to be forced between the contacting surfaces of the cylinder and the piston.

Fig. 4 is a horizontal section on the irregular line 6—6 of Fig. 3.

A designates a portion of a body forming one element of an automobile or other motor driven vehicle. B, C are the front and rear axles, respectively, of a running gear of the vehicle, and D are the road wheels on said axles. I have not considered it necessary to illustrate or describe in detail a particular form of vehicle body, axles or wheels of the vehicle, for the reason that these parts may be of the usual or any preferred construction.

For operatively connecting the vehicle body with the running gear, I employ a plurality of load supporting devices in lieu of the springs and shock absorbing devices ordinarily resorted to in automobiles. The load carrying devices are, preferably, four in number, one of said devices being positioned at each corner of the vehicle body. Each load carrying device embodies a cylinder 5, a piston 6 and a piston rod 7, a practical construction of said piston being shown more particularly in Figs. 3 and 4. The cylinder is open at its lower end, the upper end of the cylinder being tightly closed by a head 8 which is preferably bolted or otherwise secured firmly in position so that the head may be removed when desired. The cylinder occupies a vertical position at, or adjacent to, a corner of the vehicle body A, and said cylinder is fastened rigidly to said vehicle body by suitable means, such as the face plate 9, the latter being adapted to rest upon the vehicle body or a part thereof and to be secured rigidly in position thereto by bolts or other fastenings.

Piston 6 is provided with a plurality of packing rings 10, said piston being similar to the pistons of ordinary internal combustion engines, i. e. said piston is provided with a smooth polished surface which coöperates with a similar polished surface on the interior of the cylinder. It is preferred to lubricate the contacting surface of the cylinder and the piston in the usual manner, i. e. by rubbing a lubricant of graphite and mica into or upon such surfaces, thereby reducing the friction between the contacting surfaces of the piston and the cylinder. The piston rod is connected pivotally at 11 with the piston at the under side thereof, and said piston rod extends downwardly from the cylinder, in order that the lower end thereof may be connected mechanically with the running gear or axle of the vehicle. Said piston rod 7 is shown in Figs. 1 and 2 as being connected pivotally by a bolt 12 to a bracket 13 attached to an axle, as B, but the particular means for operatively connecting the piston rod with the running gear is not a material feature of the invention, so that this part of the structure may be modified by a skilled constructor.

From the foregoing description it is apparent that the cylinders are attached to the body and the pistons have movable connection with the running gear, said pistons and cylinders coöperating with each other, in order that they may have a limited relative movement, for the purpose of compressing the elastic load carrying and shock absorbing medium. This medium may be air, gas, or a gaseous substance which is contained in the cylinders under sufficient pressure to support the weight of the body and its load. For this purpose, the air or gas is forced into the cylinders of the load carrying devices under pressure, and to this end, suitable mechanical devices may be, and preferably are, provided on the cylinders, for the purpose of supplying the latter with air or gas until the desired pressure shall have been established therein. In Fig. 3 the cylinder head 8 is provided with an inflating valve 14 and with a pressure gage 15 of any suitable construction, whereby a hose or pipe from an inflating pump or other source of gaseous pressure, may be connected to inflating valve 14, for the purpose of supplying the air or gas to the cylinder, the pressure of the inflowing air or gas being indicated by gage 15.

The air or gas within the cylinders of the load carrying devices is under sufficient pressure to support the weight of the body and a load which may be imposed thereon, but in the normal position of the pistons within the cylinder a sufficient space is left between the pistons and the cylinder head for a relative movement between the cylinder and the piston so as to allow the piston to ascend or the cylinder to descend under shocks and jars which arise from the vehicle wheels traveling over irregularities in the road surface or meeting with obstructions therein. A sudden movement of the piston in an upward direction tends to compress the air or gas so that under these conditions the pressure of said air or gas will exceed the normal pressure within the cylinder, and this condition in the operation of the load carrying device renders it desirable to preclude leakage of the air or gas under the maximum pressure to which it is subjected. Accordingly, I employ means whereby the air or gas is precluded from leakage under normal or abnormal pressures, such means being a liquid seal within the cylinder. The liquid seal may be a free liquid contained within the cylinder and is imposed upon piston head 6 therein. The liquid may consist of water, oil, glycerin or any other flow material, and a suitable quantity of said liquid is employed so as to produce a strata or layer between the air or gas chamber of the cylinder and that part of the internal surface of the cylinder with which the piston is adapted to frictionally contact, whereby an increase in the pressure of the air or gas within the cylinder due to a relative movement between the cylinder and the piston, forces the liquid between the contacting surfaces of the cylinder and piston, in order to render the seal more effectual in precluding the leakage of the air or gas under pressure from the cylinder of the load carrying mechanism.

The liquid seal when free within the cylinder has, or may have, a tendency to splash therein, and assuming that oil is used as the seal, the oil has a tendency to emulsify with the air or gas. To preclude this splashing and to overcome emulsification, it is preferred to employ a particular construction of piston which of itself contains a liquid sealing medium which is subjected to the pressure of the air or gas when abnormal pressure is established within the cylinder so that the liquid will be forced into the space between the cylinder and the piston, in order to produce an efficient and reliable seal for precluding the leakage of air or gas. This part of the invention is illustrated more particularly in Figs. 3 and 4, wherein 5 designates the cylinder, 6 the piston, and 7 the piston rod, the respective end portions of which are pivotally connected at 11 and 12 to the piston and the bracket 13 on the axle B. The piston is provided with grooves for the reception of the ordinary packing 10; said piston is provided also, with a groove for receiving an oil or lubricant saturated packing 17, and, furthermore, the piston is provided intermediate certain of the packings with an annular groove 18. A central chamber 19 is provided within the body of the piston, and this chamber 19 is in communication with the annular groove 18 by a plurality of radial passages 20. Said chamber, the radial passages and the annular groove constitute a storage chamber for a liquid seal indicated at 21 in Fig. 3, the liquid of said seal being confined or contained interiorly within the piston. Said piston is provided, also, with a vertical pocket 22 within which is positioned a plunger 23, said plunger being engaged by a spring 24 which is retained in position by a keeper 25. The plunger and its spring are carried by the piston so as to be movable therewith, and said plunger protrudes or is exposed through the top of the piston, whereby the plunger is subjected to the pressure of air or gas confined within the cylinder. The tension of the spring upon the plunger tends to force the liquid of seal 22 into the annular groove 18 of the piston so that under all conditions the liquid is under pressure and is retained between the contacting surfaces of the piston and the cylinder. In the event of a sudden shock or jar on the running gear due to the wheels riding over an obstruction in the road, the piston is moved upwardly, thus compressing the air or gas between the cylinder head and the piston and establishing an increased pressure above the normal within said cylinder. This sudden increase in the pressure of the air or gas has a tendency to displace the liquid from between the contacting surfaces of the cylinder and the piston, but this result is counteracted by the pressure of the plunger upon the liquid seal, said plunger being exposed to the pressure of the air or gas.

The main purposes of the plunger are to prevent emulsification of the liquid seal with the air or gas and to compensate for any leakage in the sealing liquid. Should the quantity of liquid be reduced to a small extent by reason of leakage from the cylinder, the plunger will be pressed downwardly somewhat by the air or gas pressure in order to displace the liquid by forcing it between the contacting surface of the cylinder and piston.

A swaying movement of the vehicle body A in the direction of its length is limited or arrested by suitable devices, and in Figs. 1 and 2 of the drawings there are shown tie rods or links 26, 27, the main purpose of which is to keep the wheels under the car as they move forward. Tie rods 26 are pivoted to the body A and front axle B, whereas tie rods 27 are pivoted to rear axle C and to vehicle body A intermediate its ends. These links may be supplemented by any usual devices, such as straps, to limit the fore and aft or longitudinal swaying movement of the body, but as these devices are ordinary in the art, it has not been considered necessary to describe the same in detail.

The vehicle body is subjected when turning a corner at speed to a sidewise swaying movement, and to arrest this sidewise movement, I prefer to employ suitable means which coöperate with the chassis or axles and with said body. This part of the invention is embodied in thrust rods 28, 29, a pair of said thrust rods being employed near each end portion of the vehicle, and preferably adjacent to two of the load supporting devices, see Fig. 2. The thrust rods are inclined in opposite directions, the thrust rod 28 being pivoted by bolt 30 to body A. The other end of said thrust rod 28 is pivoted by bolt 33 with a cross head 32 sliding in a guideway 31 on axle B. The other thrust rod 29 is pivoted by bolt 34 to the body A and by a bolt 37 to a crosshead 36 sliding in the guideway 37 of the axle B. The cross heads of the thrust rods in the normal position of the vehicle body will be substantially central within the guide ways 31, 35, respectively, but should the vehicle body sway to the right in Fig. 2, thrust rod 28 will move the cross head toward the right until it abuts against the end of the guide way, thus arresting the further swaying movement of the vehicle body, the strain or pressure being imposed directly against the axle. A swaying movement in an opposite direction or toward the left in Fig. 2 will move thrust rod 29 and cross head 36 in a corresponding direction and until said cross head is limited by contact with an end wall of the guide way 35, the strain or pressure being borne by the axle.

While I have shown and described the cylinders as being attached to the body, and the pistons as being connected with the running gear, it is evident that these parts may under some circumstances be reversed by attaching the cylinder to the running gear and the pistons to the vehicle body, but as this involves a mere reversal of the parts composing the load supporting devices, I have not considered it necessary to illustrate the same, or to describe it in detail.

Parts of my invention may be used without the whole, and other changes in the details of construction, and in the form, size and proportion of parts may be made by a skilled constructor without departing from the spirit or sacrificing any of the advantages of the invention as defined within the annexed claims.

Having thus fully described the invention, what I claim as new, and desire to secure by Letters Patent is:—

1. A load-carrying device for the body of a vehicle embodying a cylinder and a coöperating piston provided with means for operatively connecting the same with a body and a running gear respectively, said piston being provided with an annular groove and with an internal chamber closed at the bottom thereof, said chamber and groove being adapted to contain a sealing liquid which is displaceable from the chamber by an increase in the pressure of the gaseous medium above the initial pressure, which increased pressure is due to a relative movement between the cylinder and the piston.

2. A load-carrying device for the body of a vehicle embodying a cylinder and a coöperating piston provided with means for operatively connecting the same with a body and a running gear respectively, said piston being provided with an annular groove and with an internal chamber for containing a sealing liquid, and means for displacing the sealing liquid operable by an increase in the pressure of the gaseous medium above the initial pressure established in said cylinder.

3. A load-carrying device for the body of a vehicle embodying a cylinder and a coöperating piston provided with means for operatively connecting the same with a body and a running gear respectively, said piston being provided with an annular groove and with a closed bottom chamber for containing a sealing liquid, means for establishing within the cylinder a gaseous shock absorbing medium the initial pressure of which is sufficient to sustain the weight of said vehicle body and its load, and a plunger carried by the piston for contact with the sealing liquid and exposed to an increase in the initial pressure of the gaseous medium for forcing the sealing liquid between the contacting surfaces of the cylinder and the piston.

4. A load-carrying device for the body of a vehicle embodying a cylinder and a coöperating piston provided with means for operatively connecting the same with a body and a running gear, respectively, said piston being provided with a chamber for containing a sealing liquid, and means operable by an increase in the initial pressure of the gaseous medium for forcing the sealing liquid between the contacting surfaces of the cylinder and the piston.

5. A load-carrying device for the body of a vehicle embodying a cylinder and a coöperating piston provided with means for operatively connecting the same with a body and a running gear, respectively, said piston being provided with an annular groove and with a central chamber for containing a sealing liquid, a plunger carried by the piston and operatively related to the liquid present in the chamber, and means for yieldingly retaining the plunger in contact with the sealing liquid, said plunger being operable to displace the liquid by an increase in the pressure above the pressure initially established between the cylinder and piston.

In testimony whereof I have signed my name to this specification in the presence of two subscribing witnesses.

RALPH VICTOR HAYES.

Witnesses:
J. F. MOTHERSHEAD,
M. E. FREEMAN.